United States Patent
Kristiansen

(10) Patent No.: US 7,388,585 B2
(45) Date of Patent: Jun. 17, 2008

(54) METHOD, SYSTEM AND DEVICE FOR EFFICIENT DISTRIBUTION OF REAL TIME THREE DIMENSIONAL COMPUTER MODELED IMAGE SCENES OVER A NETWORK

(75) Inventor: Stig Ronald Kristiansen, Oslo (NO)

(73) Assignee: My Virtual Reality Software, Oslo (NO)

( * ) Notice: Subject to any disclaimer, the term of this patent is extended or adjusted under 35 U.S.C. 154(b) by 101 days.

(21) Appl. No.: 11/227,384

(22) Filed: Sep. 15, 2005

(65) Prior Publication Data

US 2006/0061584 A1    Mar. 23, 2006

Related U.S. Application Data

(60) Provisional application No. 60/611,578, filed on Sep. 20, 2004.

(51) Int. Cl.
*G06T 17/00* (2006.01)
*G06F 15/16* (2006.01)
*G06K 9/46* (2006.01)

(52) U.S. Cl. .................. 345/428; 382/239; 709/231
(58) Field of Classification Search ................ 345/428; 382/239, 240
See application file for complete search history.

(56) References Cited

U.S. PATENT DOCUMENTS

| | | | |
|---|---|---|---|
| 4,707,738 A * | 11/1987 | Ferre et al. ............... 348/400.1 |
| 5,825,998 A * | 10/1998 | Brechner ................... 345/428 |
| 5,928,330 A * | 7/1999 | Goetz et al. ................ 709/231 |
| 5,953,506 A * | 9/1999 | Kalra et al. ................ 709/231 |
| 5,956,729 A * | 9/1999 | Goetz et al. .............. 707/104.1 |
| 6,081,278 A * | 6/2000 | Chen ......................... 345/473 |
| 6,118,456 A * | 9/2000 | Cooper ...................... 345/619 |
| 6,204,857 B1 * | 3/2001 | Piazza et al. .............. 345/582 |
| 6,278,432 B1 * | 8/2001 | Ratnakar .................... 715/748 |
| 6,314,452 B1 * | 11/2001 | Dekel et al. ............... 709/203 |
| 6,329,986 B1 * | 12/2001 | Cheng ........................ 345/419 |
| 6,343,350 B1 * | 1/2002 | LaMaire et al. ............ 711/156 |
| 6,348,921 B1 * | 2/2002 | Zhao et al. ................. 345/428 |
| 6,373,482 B1 * | 4/2002 | Migdel et al. ............. 345/419 |
| 6,377,257 B1 | 4/2002 | Borrel et al. |
| 6,378,053 B1 * | 4/2002 | Lamaire et al. ............ 711/159 |
| 6,396,503 B1 * | 5/2002 | Goss et al. ................. 345/582 |

(Continued)

OTHER PUBLICATIONS

E. Teler and D. Lischinski, "Streaming of complex 3D scenes for remote walkthroughs", In Computer Graphics Forum, vol. 20(3), 39 pages, 2001.*

(Continued)

*Primary Examiner*—Ulka Chauhan
*Assistant Examiner*—Roberta Prendergast
(74) *Attorney, Agent, or Firm*—Knobbe Martens Olson & Bear LLP

(57) ABSTRACT

The present invention is related to a method, system and device for distributing in real time data related to three dimensional computer modeled images scenes over a network. To provide a faster and better visual quality of the rendered frames on a client computer, the client computer first receives an initial file comprising a minimum of geometrical data and texture data to provide a minimum of visual quality of the displayed scene. By evaluating an importance factor for textures used in the scenes, the client computer may request the server for further data to improve the visual quality of the scene.

39 Claims, 5 Drawing Sheets

U.S. PATENT DOCUMENTS

| | | | |
|---|---|---|---|
| 6,417,860 B1* | 7/2002 | Migdal et al. | 345/582 |
| 6,629,891 B2* | 10/2003 | Nagayama | 463/32 |
| 6,684,255 B1* | 1/2004 | Martin | 709/231 |
| 6,873,343 B2* | 3/2005 | Chui | 345/667 |
| 7,103,621 B2* | 9/2006 | Rodriguez et al. | 708/204 |
| 7,106,328 B2* | 9/2006 | Royan | 345/428 |
| 7,139,794 B2* | 11/2006 | Levanon et al. | 709/203 |

OTHER PUBLICATIONS

J.-E. Marvie, J. Perret, and K. Bouatouch, "Remote interactive walkthrough of city models using procedural geometry", Technocal Report PI-1546, IRISA, Jul. 2003, http://www.irisa.fr/bibli/publi/pi/2003/1546/1546.html.*

S. Rusinkiewicz and M. Levoy, "Streaming QSplat: A viewer for networked visualization of large, dense models", In Symposium on Interactive 3D Graphics, pp. 63-68, 2001.*

Shumilov, S. et al., "Management and visualization of large, complex and time-dependent 3D objects in distributed GIS", Proc. of 10th ACM international Symposium on Advances in Geographic information Systems, Nov. 2002, ACM Press, NY, NY, pp. 113-118.*

Faisstnauer, et al., "Scheduling for very large virtual environments and networked games using visibility and priorities", Proceedings Fourth IEEE International Workshop on Distributed Simulation and Real-Time Applications, (DS-RT 2000), Aug. 24-26, 2000, pp. 31-38.*

* cited by examiner

METHOD, SYSTEM AND DEVICE FOR EFFICIENT DISTRIBUTION OF REAL TIME THREE DIMENSIONAL COMPUTER MODELED IMAGE SCENES OVER A NETWORK

CROSS-REFERENCE TO RELATED APPLICATIONS

This application claims priority under 35 U.S.C. § 119(e) from provisional application No. 60/611,578 filed Sep. 20, 2004, which is hereby incorporated by reference.

BACKGROUND

1. Field

The present invention is related to a method, system and device for distributing in real time data related to three dimensional computer modeled image scenes over a network, and more specifically to a method, system and device for distributing in real time, over a network, texture, geometry and other related three dimensional parameters for said image scenes dependent on an importance value.

2. Discussion of Related Technology

Three dimensional modeled image scenes used for example in virtual reality scenes, in three dimensional "live" modeling as in Computer Aided Design Systems and other types of computer visualization techniques etc., three dimensional geometry parameters and three dimensional objects called textures are defining appearance etc. of objects in a scene or in a series of scenes. The computer data files for complex huge models may be very large and can typically span from several megabytes to gigabytes in size, and may be impractical to distribute over a network with limited bandwidth. Even when there is no real time requirement, the time used for the transfer may be too large to be of practical use.

Another aspect of the client/server rendering problem is the capacity in each client computer. There will always be a limited amount of resources available for rendering purposes, for example a limited amount of allocated memory for the images downloaded to the client computer. In prior art this is usually solved by limiting the file size for downloading, to the capacity of the client computer with the lowest available resources for the task. Therefore, automatic scaling is a problem with prior art solutions, especially scaling to individual client computer requirements and possibilities.

A common technique in real time rendering engines is to use so called mipmap textures. This means that the rendering engine has several copies of each texture stored in decreasing level of detail for each texture. Usually, each level provides half the previous level of detail down to one by one pixel textures. Prior art such as DirectX or OpenGL utilize these mipmap levels to filter between the different levels of detail dependent on a distance between an image capturing device such as a camera or generally speaking, a distance of view from an observer or observation point to an object in a scene. In a three dimensional view, elements closer to the observing point is rendered with more details in the texture than those parts farther away from the observing point. Usually, all the texture levels for all textures must be transferred from a server prior to the rendering of a scene in a client computer. Some prior art solutions transfer only a subset of the mipmaps and utilize filtering to reduce aliasing artifacts in the rendered images.

The common method in prior art for modeling a data set defining scenes for three dimensional visualization, is by utilizing a reference system for a complete scene, sometimes referenced as a global reference system, and by utilizing local reference systems each attached to objects in said scene. In the global reference system, vectors describe shapes and locations of objects while the local reference systems provide polygons for the texture descriptions. To provide enough resolution for a texture, the polygons are defined as floating point numbers. The same texture may be utilized by different objects in a scene. However, the enormous amount of data that the visualization of such three dimensional real time scenes needs, require some trade off between the quality of the visual appearance on the computer display and the amount of data necessary to distribute from a server to a client computer, for example. The known "trade off" techniques as known to a person skilled in the art, does not take into account the visual appearance as such, but assume that distance of view and filtering alone will be a sufficient trade off to provide a workable solution.

In U.S. Pat. No. 6,377,257 B1 with the title: "Method and Apparatus for delivering 3D Graphics in a networked environment", it is disclosed a solution addressing these matters by providing a seamless continuous rendering options between server-only rendering and client-only rendering. According to this solution, a scene model is partitioned into at least two parts. Initially, said first part comprising initial geometry description of said scene is downloaded to the client computer from the server. While the client computer executes the rendering based on the initial file comprising said first part, the server computer may continue to download said second part of said scene, thereby for example providing more details in the scene when the client computer starts rendering said second part. However, the speed of the downloading is improved, but to be able to achieve a necessary level of details in the visualization may require a substantial amount of further downloads of a specific scene.

Practical use of for example Computer Aided Design Systems using three dimensional real time visualization techniques, for example to certify and verify a design, require another type of trade off to provide a workable solution. It is necessary to control the level of detail to be able to evaluate a design correctly in every detail.

In other real time three dimensional visualization systems and applications, the speed of rendering and quality of images may be mandatory for the usefulness of such systems. Therefore, there is a need for a method, system and device that can improve the visual quality and speed of rendering in such real time three dimensional visualization systems.

SUMMARY OF CERTAIN INVENTIVE ASPECTS

According to an example of embodiment of the present invention, a client computer requesting a three dimensional modeled image scene from a server, first will receive an initial amount of data comprising the necessary geometrical data defining the scene in the vicinity of an observer or an observing point (such as a camera), and a minimum of texture data needed to provide a minimum of visual quality for initial rendering. When this minimum of data is rendered, a process according to the present invention is started to evaluate which further data is necessary to download from the server to improve and refining the visual quality. The order of downloading further data is decided by the client computer based on a set of rules intended to provide a better visual quality of the rendered three dimensional images displayed on the client computer display. According to the present invention, this provides a streaming effect on the three dimensional views displayed in a sequence.

It is yet another aspect of the present invention to provide compressing of geometry data before transferring such data form a server to a client. According to an example of embodiment of the present invention, geometry data residing on a server are converted from floating point format to an integer format thereby providing a significant reduction in the number of bytes necessary to transfer for visualization on the client computer. According to this example of embodiment, the client computer convert the geometry data received in integer format back to floating point format before a rendering engine is using the geometry data.

BRIEF DESCRIPTION OF THE DRAWINGS

FIG. 4b is a flow diagram illustrating a continuation of the flow diagram depicted in FIG. 4a.

DETAILED DESCRIPTION OF CERTAIN INVENTIVE EMBODIMENTS

Figure 1:
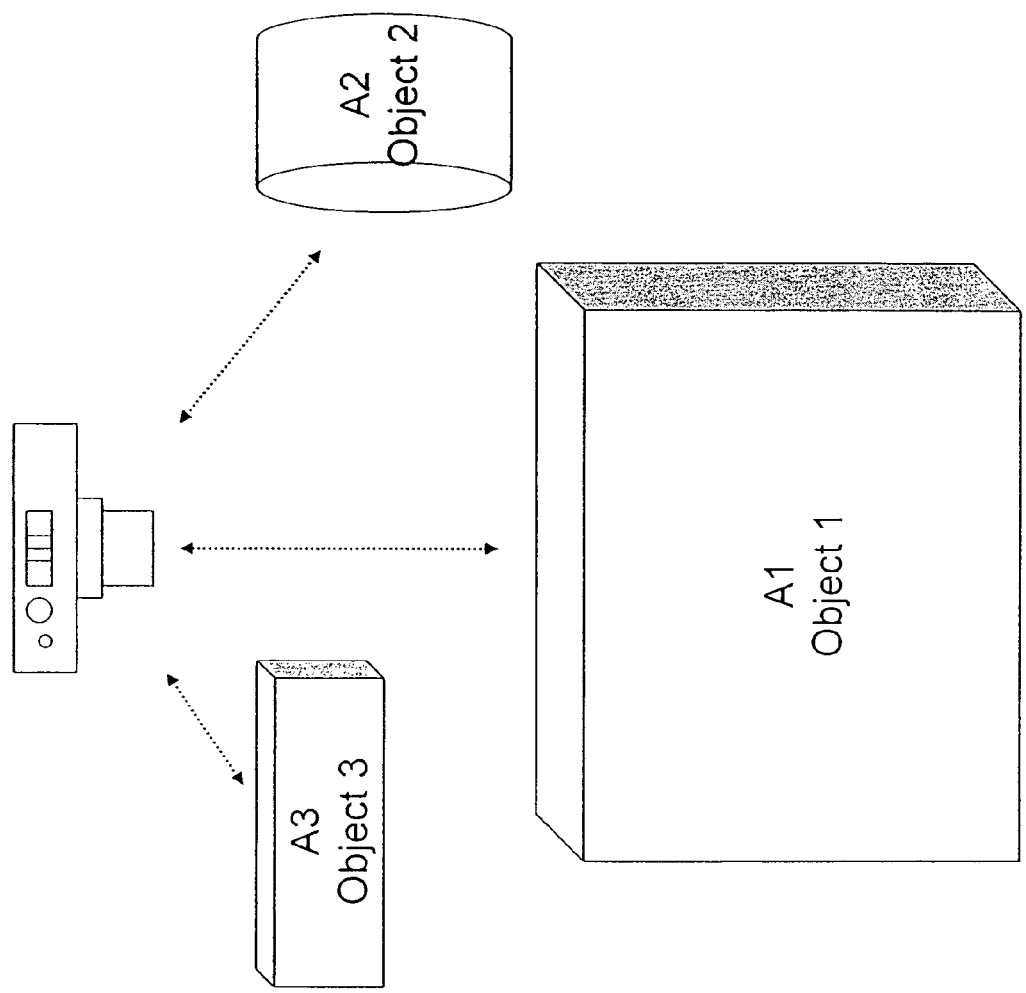
FIG. 1 illustrates an example of a camera viewing a scene comprising three objects.
Figure 2:
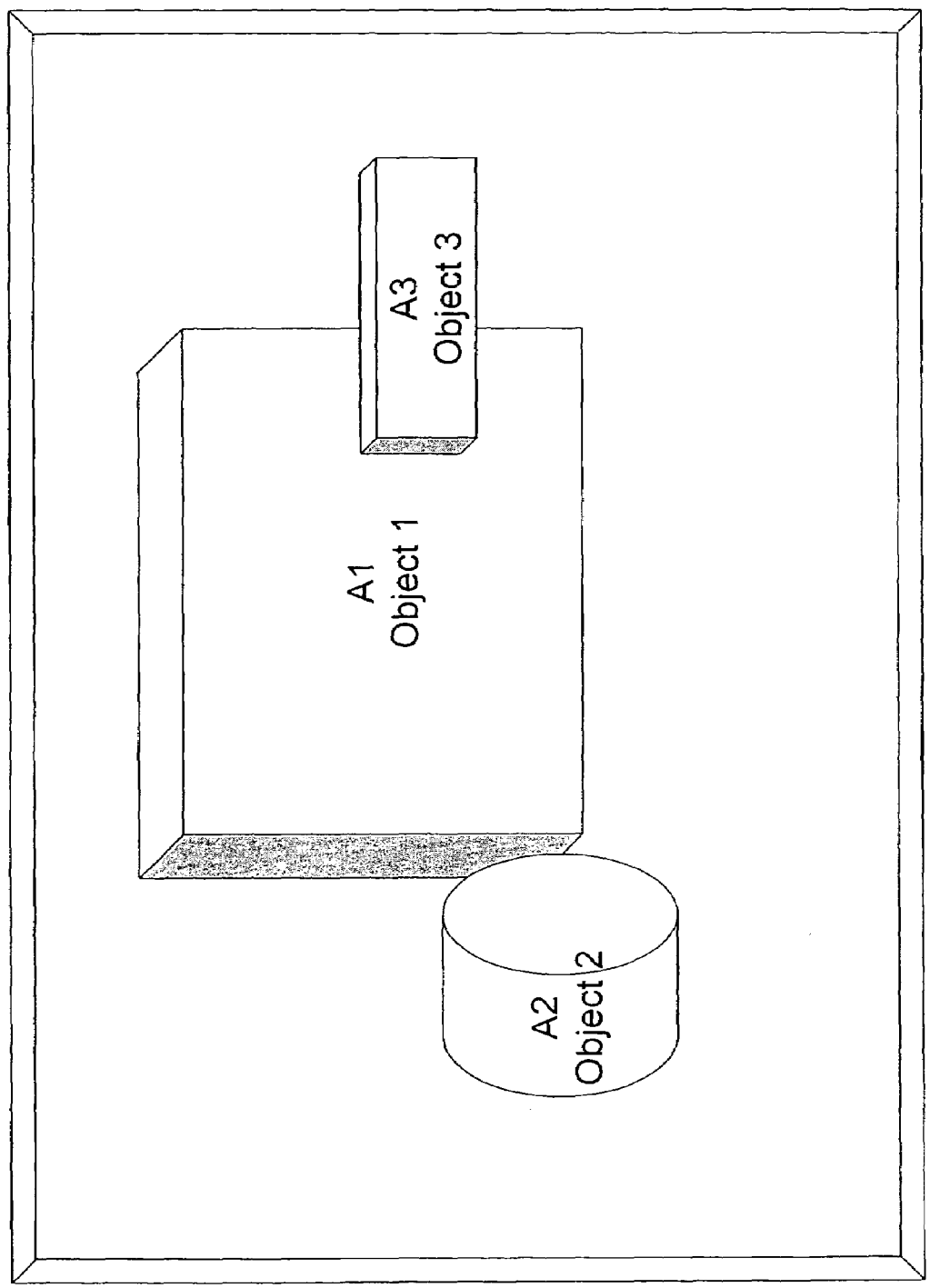
FIG. 2 illustrates how the scene depicted in FIG. 1 is displayed on a computer display.

FIG. 1 is illustrating how a camera for example can view three objects located at different distances and angles of view from the camera. The objects may have different shapes and textures. FIG. 2 is illustrating how these three objects can be imaged on a flat computer screen. According to prior art the rendering engine will display the object A2 and object A3 with a higher degree of details than object A1 since the object A2 and A3 are located closer to the observing point (camera).

According to the present invention, first a minimum of data is downloaded from a server to provide a minimum of detailed quality of visualization of a scene on the client computer display. The geometrical data defines the shapes of the present objects while the texture data provides a minimum of quality for the appearance of the objects on the display. Thereafter, a set of rules are used in the client computer to decide which additional texture levels that are to be downloaded from the server.

According to the present invention, the level of details (or the number of mipmap levels) used in the texture should also reflect the importance of an object as displayed on a computer display. According to the present invention, several factors may contribute to the importance of an object, and may contribute in adjusting the level of details or number of mipmap levels that are used on displayed objects.

According to an aspect of the present invention, the evaluation of further downloading of details is decided individually in each separate client computer. Therefore, any embodiment of the present invention will scale automatically to the resources available or allocated to the rendering task in every client computer in the network.

According to the present invention, an importance factor for an object may be how much a texture covers a computer display or screen. The reason being, that if it covers a substantial portion of the available surface of the display, it does so because a user wants to view an object as detailed as possible. According to an example of embodiment of the present invention, a texture may be associated with a screen coverage factor. In an example of embodiment of the present invention the screen coverage factor may be estimated on basis of the viewing angle from the observation point, the distance to the object from the observation point and the size of the object. Some prior art rendering engines may report a screen coverage factor for an object back to the system. This parameter is designated as C in the following disclosure.

Textures not visible at present on the display, but that are associated with objects in the vicinity of the observing point, and therefore probably will be downloaded soon, may be associated with an importance value reflecting this situation. According to an example of embodiment of the present invention, a texture may be associated with an offset value for the screen coverage factor described above. This parameter is designated as $C_b$ is in the following disclosure. $C_b$ may be estimated or reported back as described above for C.

Another importance factor may be the angle of view from the observing point to the object. In an example of embodiment of the present invention, if a camera is pointing directly onto an object, as the camera does on object A1 in FIG. 1, it does so because the scene comprises an object of high importance for the scene. According to an example of embodiment of the present invention, a texture may be associated with an angle of view. This parameter is designated as $A_v$ in the following disclosure. $A_v$ may be determined in the global reference system.

According to the present invention, the importance of an object may also be a design parameter. In an example of embodiment of the present invention, an importance value may be assigned to an object when it is created or instantiated in the computer system. This parameter is designated as B in the following disclosure.

The number of mipmap levels downloaded to a client computer at any point in time may differ from the total number of mipmap levels available on the server. If the difference is large it implies that there are many levels of details left for downloading from the server. A high number of mipmap levels or details indicate that the corresponding texture is regarded as important by the designer of the texture. Therefore it is possible to assign a high value of importance to such a texture. However, if the difference is zero there is no point in providing an importance to the texture since no further mipmap level is available for downloading. According to an example of embodiment of the present invention, an importance factor reflecting this number of levels left on the server may be assigned to a texture. This parameter is designated as N in the following disclosure.

The distance from a viewing point (or camera) to an object using the texture during rendering of the scene is designated as A in the following disclosure. A may be determined in the global reference system.

According to the present invention there exists a relationship between these identified parameters providing an importance for a texture when used on an object during rendering of a scene. However, this is not identified as an analytical deduced relationship between the parameters.

The inventors have conducted experiments providing an indication that there is an inverse relationship with the distance A. That is, the importance factor is proportional to 1/A. In nature there is very often found relationships that are proportional to the inverse of the square of a parameter. For example, gravitation is proportional to $1/r^2$. Since mipmap levels provide half the details of a preceding mipmap level, any linear relationship with 1/A will provide a quadratic relation between a mipmap level and an importance factor associated with this mipmap level. Further experiments performed by the inventors suggest that there is a relationship between how mipmap levels are decreasing in level of detail and the importance factor. For example, a linear decrease in detail between consecutive mipmap levels implies an importance factor proportional to $1/A^2$. Therefore the present invention is not limited to importance factors that provide a linear relationship proportional to 1/A, but the scope of the invention encompass all relationships proportional to any inverse function that is possible to envisage for the distance A.

According to an example of embodiment of the present invention, an initiated transfer of a scene from a server to a client computer, comprises transfer of a file providing vectors defined in the global reference system for some of the objects in the vicinity of the observation point for the scene, and sufficient texture data providing a minimum of visual quality for the scene. Such initial files describing initial data for the different scenes may be provided on the server by a separate process on the server itself or as a one time operation when the scenes are created or instantiated on the server computer.

Figure 3:
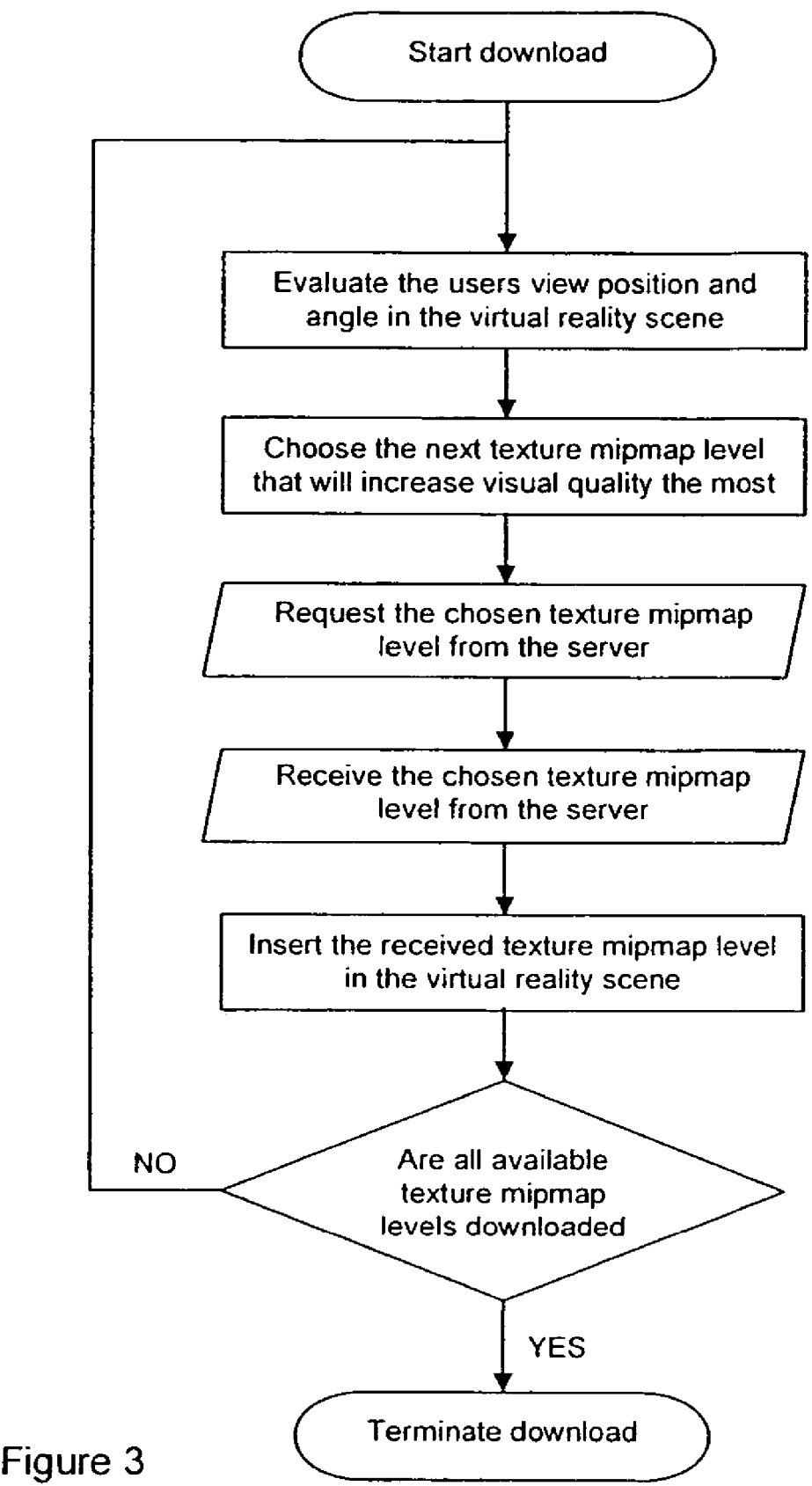
FIG. 3 is a flow diagram illustrating steps of downloading further mipmaps according to an example of embodiment of the present invention.

When the initial file for a scene is received on the client computer, the client computer initiate a series of steps to evaluate if it is necessary to download further mipmap levels to the client computer. FIG. 3 illustrates a flow diagram of the basic steps that are performed for selecting the mipmap levels.

According to an example of embodiment of the present invention, the client computer will calculate the importance factors for all textures used in the scene. Based on the highest importance number, extra mimpap levels are downloaded from the server providing a better visual quality that only affects the objects that are important for the user or application of the system, thereby reducing the number of transfers that are necessary to perform to achieve the desired level of visual quality.

In another example of embodiment of the present invention, the calculation of the importance factors may be performed on the previous frame since it is usual that a camera or observing point never moves fast around the scenes. The consecutive frame and the preceding frame are both associated with the present scene by just a slight difference in observation point. A system parameter incorporated in the client/server communication may signal which texture data to be used in the evaluation of the importance factor. In an example of embodiment, the choice of texture data used for the evaluation may be user selectable.

The step of calculating the importance factors for the different textures use a combination of parameters as described above to derive the importance values.

In an example of embodiment, the importance factor P is defined as:

$$P = \frac{C}{A}$$

In yet another example of embodiment, the importance factor is defined as:

$$P = \frac{1}{AA_v}$$

In yet another example of embodiment, the importance factor is defined as:

$$P = \frac{C + C_b}{A}$$

In yet another example of embodiment, the importance factor is defined as:

$$P = \frac{B}{A}$$

In yet another example of embodiment, the importance factor is defined as:

$$P = \frac{BN^2}{A}$$

Experiments conducted by the inventors indicate that a best mode of embodiment of the importance factor according to the present invention is:

$$P = \frac{BN^2 \sqrt{C + C_b}}{A}$$

According to another aspect of the invention, a reduction of the amount of data that is necessary to transfer between the server and the client computer may in addition to the above disclosed steps further comprise compressing the floating point values for the texture data.

Texture coordinates are used to map a texture onto geometry as known to a person skilled in the art. The coordinates may consist of two floating point values x and y where (x,y)=(0.0,0.0) reference one corner of the image as described by the local reference systems associated with the objects. (x,y)=(1.0,1.0) denotes the opposite corner. However, texture coordinates may be higher than one or lower than zero when the textures are tiled several times over the geometry as known to a person skilled in the art.

According to an example of embodiment of the present invention, relevant data for the scenes stored on the server can be converted to integer format without losing significant precision. For example, a vertex associated with an object being 10 meters long, the error introduced by converting a floating point number to an integer value would be +/−10 m/65536 equal +/−0.1526 millimeter, which is normally an insignificant error. However, according to the present example of embodiment, data are tested to determine if they exceed a maximum value. According to the present example of embodiment, individual threshold values may be assigned to texture data, vertex data, etc. If they exceed the assigned maximum value, the original data are used. When the integer values are transferred to the client computer, the client computer converts the integers back to floating point format before they are used by the rendering engine.

Figure 4A:
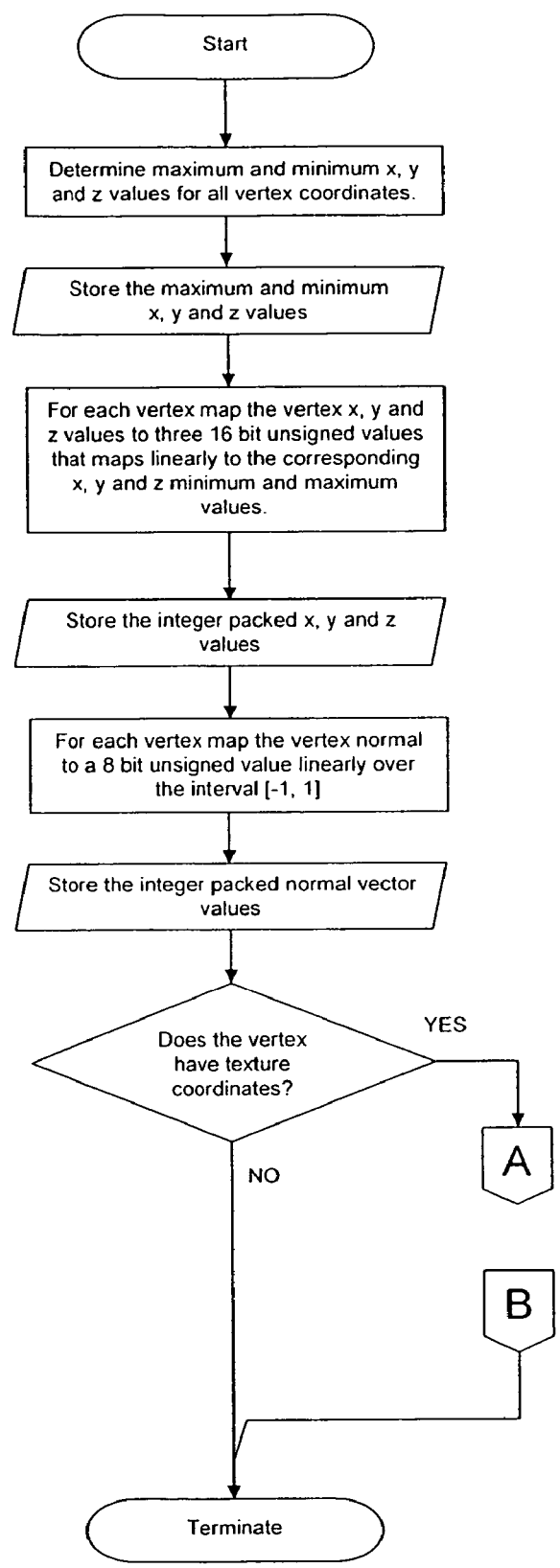
FIG. 4a is a flow diagram illustrating the steps of compressing data according to an example of embodiment of the present invention.
Figure 4B:
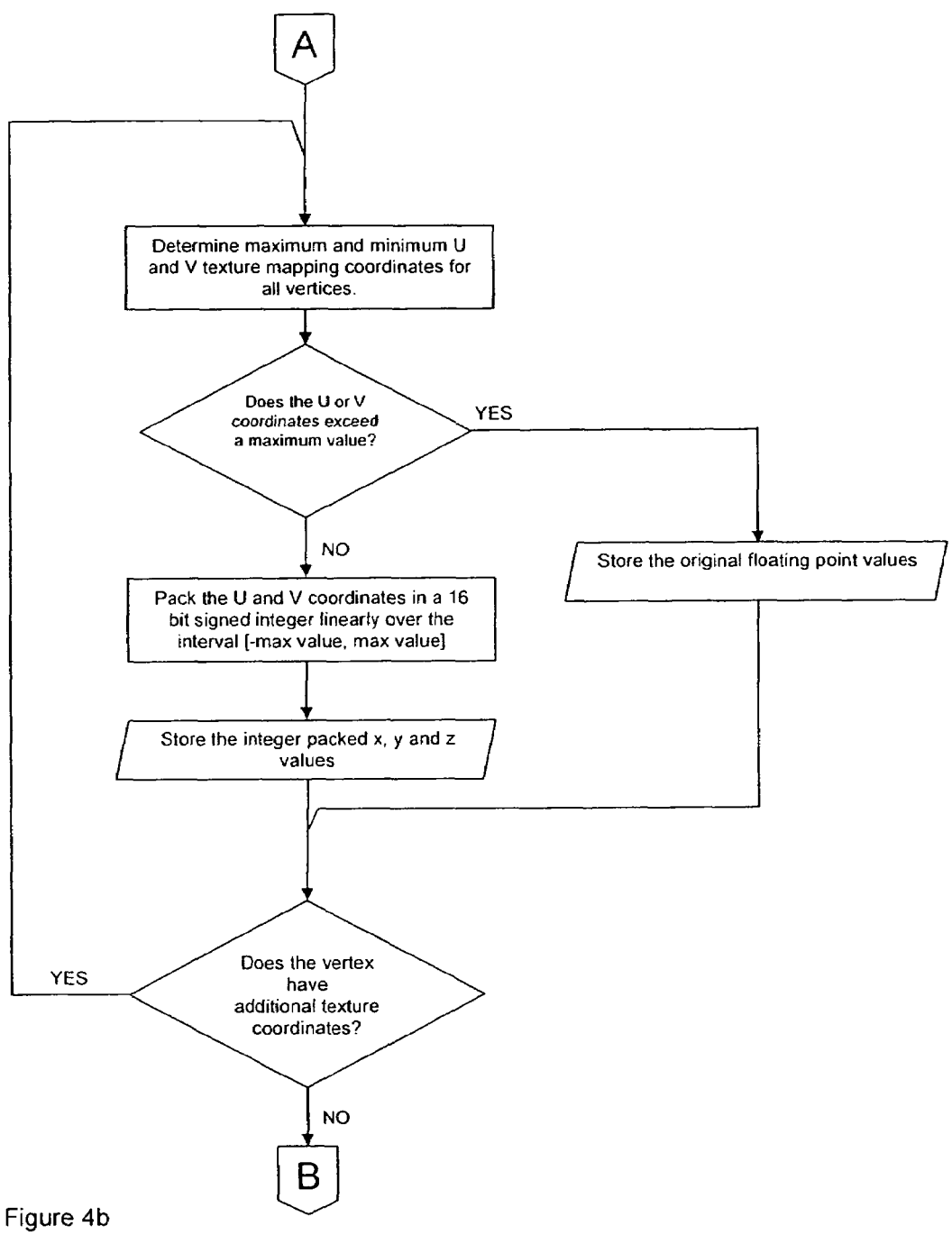

Experiments conducted by the inventor shows that more than 40% reduction in data transfer may be achieved by compressing data. FIGS. 4a and 4b illustrates a flow diagram depicting the steps for the conversion of data associated with one object.

According to an example of embodiment of the present invention, the relevant data constituting a design of scenes for three dimensional rendering on a client computer comprise a software module on said server providing said initial files related to scenes that provide the sufficient minimum visual quality that is required by the system. In another example of embodiment, the conversion from floating point format to integer format is performed in a software module on said server at the same time the initial files are generated, thereby providing compression of initial files, thereby providing a much faster transfer of the initial file, and hence faster rendering of the graphical initial file as seen by the user of the system.

In the present example of embodiment, the client computer performs the evaluation of the importance factor in a software module, and the software request the server for additional data for downloading to improve the visual quality on the client computer based on the related importance factors. The conversion from integer format back to floating point format is done in a software module on the client computer.

According to an aspect of the present invention, any embodiment of the present invention scale automatically to the available resources in each client computer, However, according to an embodiment of the present invention, the same rule set or evaluation of said importance factor may be used to controllable release for example allocated memory for rendering purposes by deleting mipmaps in the client computer memory associated with importance factors with lower values than those used in the present rendering. In this simple manner, the present invention may provide a dynamic rendering that always provides the highest possible visual quality that is possible on a client computer given a limited amount of local resources in said client computer.

According to yet another example of embodiment of the present invention, the evaluation of the importance factor is done in an integrated circuit that may be designed to perform the algorithms as outlined above as known to a person skilled in the art. ASIC circuit technology is possible to exploit for such a design. Micro controller technology may also implement said algorithms as known to a person skilled in the art. In an example of embodiment, said integrated circuit communicates with the server computer via a selected communication link, such as an internal computer bus, external communication bus such as an USB port, etc. while the result of the calculations are distributed together with the texture data to each client computer in the network.

In yet another embodiment of the integrated circuitry, the integrated circuitry is located in each client computer receiving texture data via an internal data bus and providing the results of the calculations directly to rendering engine residing in the client computer via the internal data bus of the client computer.

In yet another example of embodiment of the present invention, the conversion from floating point format to integer format may also be implemented as an integrated circuit. The communication to and from this conversion circuitry may be arranged as described above.

Such integrated circuits implementing aspects of the present invention may be part of a computer system, such as a personal computer, as known to a person skilled in the art.

The invention claimed is:

1. A method of displaying three dimensional computer modeled image scenes streaming from a server to a client computer over a network, wherein the thee dimensional computer modeled image scenes comprise geometrical data describing shapes of objects and texture data describing the appearance of the objects in the scenes, the method comprising:
    transferring an initial file after receipt of a request from the client computer to the server computer, the initial file providing minimum geometrical data and minimum texture data for minimum visual quality, the minimum geometric data and minimum texture data to be used for initial display;
    in the client computer, displaying an image based on the minimum geometric data and the minimum texture data;
    in the client computer, initiating a further downloading of data from the server to the client computer according to an importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{C}{A}$$

wherein C is a screen coverage factor related to how much a texture covers a computer display surface, or how much a texture will be covering a computer display surface when being displayed, and 1/A is the inverse distance to the object from the observation point; and
    displaying the image based on the further downloaded data.

2. The method according to claim 1, wherein objects which have an importance factor lower than a maximum threshold are not updated.

3. The method according to claim 1, wherein the importance factor for a current object is based at least in part on at least one of a distance from the observation point to the current object, size of the current object, size of the current object as seen from the observation point, size of at least part of the current object not seen from the observation point, viewing angle to the current object from the observation point, and a parameter related to the current object comprised in the streaming of the three dimensional modeled image scenes.

4. The method according to claim 1, wherein initiating further downloading of data comprises calculating the importance factor for texture data for all objects in one scene at a time from the streaming scenes, downloading the texture data for the object in each respective scene having the highest importance factor, and then displaying each respective scene one at a time.

5. The method according to claim 4, wherein downloading the texture data for the object with the highest importance factor comprises downloading further data for objects in the scene according to the importance factor for each object until there is no more available allocated memory in the client computer.

6. The method according to claim 5, further comprising deleting the further downloaded texture data for the objects in the scenes having an importance factor lower than a maximum threshold when there is no more available allocated memory in the client computer.

7. The method according to claim 5, further comprising calculating an importance factor based at least in part on other downloaded texture data than those being displayed.

8. The method according to claim 7, further comprising using a system parameter or a user selectable parameter to decide which texture data is to be used in the calculation of the importance factor.

9. The method according to claim 1, wherein the transferring of the initial file further comprises:
    evaluating if the geometrical data and the texture data are within predefined limits, and if they are, converting the data from floating point format to integer format.

10. A computer system comprising a server and at least one client computer configured to display three dimensional computer modeled image scenes streaming from the server to the client, wherein the three dimensional computer modeled image scenes comprise geometrical data describing shapes of objects and texture data describing the appearance of the objects in the scenes, the system comprising:
    means for transferring an initial file after receipt of a request from the at least one client computer to the server computer, the initial file providing minimum geometrical data and minimum texture data for minimum visual quality, the minimum geometric data and minimum texture data to be used for an initial displaying;
    means, in the at least one client computer, for initiating a further downloading of data from the server to the at least one client computer according to a calculated importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{C}{A}$$

wherein C is a screen coverage factor related to how much a texture covers a computer display surface, or how much a texture will be covering a computer display surface when being displayed, and 1/A is the inverse distance to the object from the observation point; and
    means for displaying the image based on the further downloaded data.

11. The system according to claim 10, wherein objects which have an importance factor lower than a maximum threshold are not updated.

12. The system according to claim 10, wherein the importance factor for a current object is based at least in part on at least one of a distance from the observation point to the current object, size of the current object, size of the current object as seen from the observation point, size of at least part of the current object not seen from the observation point, viewing angle to the current object from the observation point, and a parameter related to the current object comprised in the streaming of the three dimensional modeled image scenes.

13. The computer system according to claim 10, further comprising means for initiating further downloading of data according to the calculated importance factor for texture data for all objects in one scene at a time from the streaming scenes, wherein the means for initiating further downloading is configured to download the texture data for the object in each respective scene having the highest importance factor, and to then provide displaying of each respective scene one at a time.

14. The computer system according to claim 13, wherein the means for initiating further downloading further comprises means for repeatedly downloading further data for objects in the scene according to the importance factor for each object until there is no more available allocated memory in the at least one client computer.

15. The computer system according to claim 14, further comprising means for deleting the further downloaded texture data for the objects in the scenes having an importance factor lower than a threshold when there is no more available allocated memory in the at least one client computer.

16. The computer system according to claim 14, further comprising means for calculating the importance factor based on downloaded texture data other than those texture data used for displaying.

17. The computer system according to claim 16, further comprising means for using a system parameter or a user selectable parameter to decide which texture data to be used in the calculation of the importance factor.

18. The computer system according to claim 10, further comprising:
    means, in the server, for testing if the geometrical data and the texture data are within predefined limits,
    means, in the server, for converting the geometrical data and the texture data from floating point format to integer format,
    means, in the server, for providing an initial file for a scene comprising the converted data,
    means, in the at least one client computer, for converting the geometrical data and the texture data from integer format to floating point format when the initial file has been transferred.

19. An electronic device for a computer system configured to display three dimensional computer modeled image scenes streaming from a server to at least one client computer over a network, wherein the three dimensional computer modeled image scenes comprise geometrical data describing shapes of objects and texture data describing the appearance of the objects in the scenes, and to start the displaying by transferring an initial file after receipt of a request from the client computer to the server computer, the initial file providing minimum geometrical data and minimum texture data for minimum visual quality, the minimum geometric data and minimum texture data to be used for an for an initial displaying, the system comprising:
    in the client computer, electronic circuitry configured to initiate a further downloading of data from the server to the at least one client computer according to an importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{C}{A}$$

wherein C is a screen coverage factor related to how much a texture covers a computer display surface, or how much a texture will be covering a computer display surface when being displayed, and 1/A is the inverse distance to the object from the observation point; and a display device configured to display the objects.

20. The device according to claim 10, wherein objects which have an importance factor lower than a maximum threshold are not updated.

21. The device according to claim 19, wherein the importance factor for a current object is based at least in part on at least one of a distance from the observation point to the current object, size of the current object, size of the current object as seen from the observation point, size of at least part of the current object not seen from the observation point, viewing angle to the current object from the observation point, and a parameter related to the current object comprised in the streaming of the three dimensional modeled image scenes.

22. The device according to claim 19, wherein the electronic circuitry is configured to initiate downloading of data according to the calculated importance factor for texture data for all objects in one scene at a time from the streaming scenes, and to download the texture data for the object in each respective scene having the highest importance factor, and then displaying each respective scene one at a time.

23. The device according to claim 22, wherein the electronic circuitry is further configured to repeatedly download data for objects in the one scene according to the importance factor for each object until there is no more available allocated memory in the at least one client computer.

24. The device according to claim 23, wherein the electronic circuitry is configured to delete the downloaded texture data for the objects in the scenes having an importance factor lower than a threshold when there is no more available allocated memory in the at least one client computer.

25. The device according to claim 23, wherein the electronic circuitry is further configured to calculate the importance factor based at least in part on other downloaded texture data than those texture data used for displaying.

26. The device according to claim 25, wherein the electronic circuitry is configured to use a system parameter or a user selectable parameter to determine which texture data to be used in the calculation of the importance factor.

27. The device according to claim 19, further comprising: electronic circuitry in communication with the server, the electronic circuitry configured to:
test if the geometrical data and the texture data are within predefined limits;
convert the geometrical data and the texture data from floating point format to integer format;
provide an initial file for a scene comprising the converted data; and
convert the converted data back from integer format to floating point format before using the data for displaying.

28. A method of displaying three dimensional computer modeled image scenes streaming from a server to a client computer over a network, wherein the three dimensional computer modeled image scenes comprise geometrical data describing shapes of objects and texture data describing the appearance of the objects in the scenes, the method comprising:

transferring an initial file after receipt of a request from the client computer to the server computer, the initial file providing minimum geometrical data and minimum texture data for minimum visual quality, the minimum geometric data and minimum texture data to be used for initial display;

in the client computer, displaying an image based on the minimum geometric data and the minimum texture data;

in the client computer, initiating a further downloading of data from the server to the client computer according to an importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{1}{AA_v}$$

wherein $A_v$ is an angle of view of the object from the observation point, and 1/A is the inverse distance to the object from the observation point; and displaying the image based on the further downloaded data.

29. A method of displaying three dimensional computer modeled image scenes streaming from a server to a client computer over a network, wherein the three dimensional computer modeled image scenes comprise geometrical data describing shapes of objects and texture data describing the appearance of the objects in the scenes, the method comprising:

transferring an initial file after receipt of a request from the client computer to the server computer, the initial file providing minimum geometrical data and minimum texture data for minimum visual quality, the minimum geometric data and minimum texture data to be used for initial display;

in the client computer, displaying an image based on the minimum geometric data and the minimum texture data;

in the client computer, initiating a further downloading of data from the server to the client computer according to an importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{C + C_b}{A}$$

wherein C is a screen coverage factor related to how much a texture covers a computer display surface, or how much a texture will be covering a computer display surface when being displayed, $C_b$ is a screen coverage factor related to how much of a texture covers an object located in a scene outside a computer display edge, and 1/A is the inverse distance to the object from the observation point; and displaying the image based on the further downloaded data.

30. A method of displaying three dimensional computer modeled image scenes streaming from a server to a client computer over a network, wherein the three dimensional computer modeled image scenes comprise geometrical data describing shapes of objects and texture data describing the appearance of the objects in the scenes, the method comprising:

transferring an initial file after receipt of a request from the client computer to the server computer, the initial file providing minimum geometrical data and minimum texture data for minimum visual quality, the minimum geometric data and minimum texture data to be used for initial display;

in the client computer, displaying an image based on the minimum geometric data and the minimum texture data;

in the client computer, initiating a further downloading of data from the server to the client computer according to an importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{BN^2}{A}$$

wherein B is an importance factor defined by a user or an application, N is a difference between downloaded number of textures with increasing level of detail and a number of defined textures stored on the server, and 1/A is the inverse distance to the object from the observation point; and displaying the image based on the further downloaded data.

31. A method of displaying three dimensional computer modeled image scenes streaming from a server to a client computer over a network, wherein the three dimensional computer modeled image scenes comprise geometrical data describing shapes of objects and texture data describing the appearance of the objects in the scenes, the method comprising:

transferring an initial file after receipt of a request from the client computer to the server computer, the initial file providing minimum geometrical data and minimum texture data for minimum visual quality, the minimum geometric data and minimum texture data to be used for initial display;

in the client computer, displaying an image based on the minimum geometric data and the minimum texture data;

in the client computer, initiating a further downloading of data from the server to the client computer according to an importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{BN^2\sqrt{C + C_b}}{A}$$

wherein C is a screen coverage factor related to how much a texture covers a computer display surface, or how much a texture will be covering a computer display surface when being displayed, $C_b$ is a screen coverage factor related to how much of a texture covers an object located in a scene outside a computer display edge, B is an importance factor defined by a user or an application, N is a difference between downloaded number of textures with increasing level of detail and a number of defined textures stored the server, and 1/A is the inverse distance to the object from the observation point; and displaying the image based on the further downloaded data.

32. A computer system comprising a server and at least one client computer configured to display three dimensional computer modeled image scenes streaming from the server to the client, wherein the three dimensional computer modeled image scenes comprise geometrical data describing shapes of objects and texture data describing the appearance of the objects in the scenes, the system comprising:

means for transferring an initial file after receipt of a request from the at least one client computer to the server computer, the initial file providing minimum geometrical data and minimum texture data for minimum visual quality, the minimum geometric data and minimum texture data to be used for an initial displaying;

means, in the at least one client computer, for initiating a further downloading of data from the server to the at least one client computer according to a calculated importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{1}{AA_v}$$

wherein $A_v$ is an angle of view of the object from the observation point, and 1/A is the inverse distance to the object from the observation point; and means for displaying the image based on the further downloaded data.

33. A computer system comprising a server and at least one client computer configured to display three dimensional computer modeled image scenes streaming from the server to the client, wherein the three dimensional computer modeled image scenes comprise geometrical data describing shapes of objects and texture data describing the appearance of the objects in the scenes, the system comprising:

means for transferring an initial file after receipt of a request from the at least one client computer to the server computer, the initial file providing minimum geometrical data and minimum texture data for minimum visual quality, the minimum geometric data and minimum texture data to be used for an initial displaying;

means, in the at least one client computer, for initiating a further downloading of data from the server to the at least one client computer according to a calculated importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{C + C_b}{A}$$

wherein C is a screen coverage factor related to how much a texture covers a computer display surface, or how much a texture will be covering a computer display surface when being displayed, $C_b$ is a screen coverage factor related to how much of a texture covers an object located in a scene outside a computer display edge, and 1/A is the inverse distance to the object from the observation point; and means for displaying the image based on the further downloaded data.

34. A computer system comprising a server and at least one client computer configured to display three dimensional computer modeled image scenes streaming from the server to the client, wherein the three dimensional computer modeled image scenes comprise geometrical data describing shapes of objects and texture data describing the appearance of the objects in the scenes, the system comprising:

means for transferring an initial file after receipt of a request from the at least one client computer to the server computer, the initial file providing minimum geometrical data and minimum texture data for minimum visual quality, the minimum geometric data and minimum texture data to be used for an initial displaying;

means, in the at least one client computer, for initiating a further downloading of data from the server to the at least one client computer according to a calculated importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{BN^2}{A}$$

wherein B is an importance factor defined by a user or an application, N is a difference between downloaded number of textures with increasing level of detail and a number of defined textures stored on the server, and 1/A is the inverse distance to the object from the observation point; and means for displaying the image based on the further downloaded data.

35. A computer system comprising a server and at least one client computer configured to display three dimensional computer modeled image scenes streaming from the server to the client, wherein the three dimensional computer modeled image scenes comprise geometrical data describing shapes of objects and texture data describing the appearance of the objects in the scenes, the system comprising:

means for transferring an initial file after receipt of a request from the at least one client computer to the server computer, the initial file providing minimum geometrical data and minimum texture data for minimum visual quality, the minimum geometric data and minimum texture data to be used for an initial displaying;

means, in the at least one client computer, for initiating a further downloading of data from the server to the at least one client computer according to a calculated importance factor P indicating the importance of both visible objects and at present not visible objects that are associated with visible objects in the vicinity of an observation point, such that objects having an importance factor P above a minimum threshold are updated with additional data, thereby providing more details for the objects having an importance factor above the minimum threshold, wherein the importance factor is defined as:

$$P = \frac{BN^2 \sqrt{C + C_b}}{A}$$

wherein C is a screen coverage factor related to how much a texture covers a computer display surface, or how much a texture will be covering a computer display surface when being displayed, $C_b$ is a screen coverage factor related to how much of a texture covers an object located in a scene outside a computer display edge, B is an importance factor defined by a user or an application, N is a difference between downloaded number of textures with increasing level of detail and a number of defined textures stored the server, and 1/A is the inverse distance to the object from the observation point; and means for displaying the image based on the further downloaded data.

36. An electronic device for a computer system configured to display three dimensional computer modeled image scenes streaming from a server to at least one client computer over a network, wherein the three dimensional computer modeled image scenes comprise geometrical data describing shapes of objects and texture data describing the appearance of the objects in the scenes, and to start the displaying by transferring an initial file after receipt of a request from the client computer to the server computer, the initial file providing minimum geometrical data and minimum texture data for minimum visual quality, the minimum geometric data and minimum texture data to be used for an for an initial displaying, the system comprising:

in the client computer, electronic circuitry configured to initiate a further downloading of data from the server to the at least one client computer according to an importance factor indicating the importance of both visible objects and at present not visible objects that are associated with visible objects in the vicinity of an observation point, such that objects having an importance factor above a minimum threshold are updated with additional data, thereby providing more details for the objects having an importance factor above the minimum threshold, wherein the importance factor is defined as:

$$P = \frac{1}{AA_v}$$

wherein $A_v$ is an angle of view of the object from the observation point, and 1/A is the inverse distance to the object from the observation point; and a display device configured to display the objects.

37. An electronic device for a computer system configured to display three dimensional computer modeled image scenes streaming from a server to at least one client computer over a network, wherein the three dimensional computer modeled image scenes comprise geometrical data describing shapes of objects and texture data describing the appearance of the objects in the scenes, and to start the displaying by transferring an initial file after receipt of a request from the client computer to the server computer, the initial file providing minimum geometrical data and minimum texture data for minimum visual quality, the minimum geometric data and minimum texture data to be used for an for an initial displaying, the system comprising:

in the client computer, electronic circuitry configured to initiate a further downloading of data from the server to the at least one client computer according to an importance factor indicating the importance of both visible objects and at present not visible objects that are associated with visible objects in the vicinity of an observation point, such that objects having an importance factor above a minimum threshold are updated with additional data, thereby providing more details for the objects having an importance factor above the minimum threshold, wherein the importance factor is defined as:

$$P = \frac{C + C_b}{A}$$

wherein C is a screen coverage factor related to how much a texture covers a computer display surface, or how much a texture will be covering a computer display surface when being displayed, $C_b$ is a screen coverage factor related to how much of a texture covers an object located in a scene outside a computer display edge, and 1/A is the inverse distance; and a display device configured to display the objects.

38. An electronic device for a computer system configured to display three dimensional computer modeled image scenes streaming from a server to at least one client computer over a network, wherein the three dimensional computer modeled image scenes comprise geometrical data describing shapes of objects and texture data describing the appearance of the objects in the scenes, and to start the displaying by transferring an initial file after receipt of a request from the client computer to the server computer, the initial file providing minimum geometrical data and minimum texture data for minimum visual quality, the minimum geometric data and minimum texture data to be used for an for an initial displaying, the system comprising:

in the client computer, electronic circuitry configured to initiate a further downloading of data from the server to the at least one client computer according to an importance factor indicating the importance of both visible objects and at present not visible objects that are associated with visible objects in the vicinity of an observation point, such that objects having an importance factor above a minimum threshold are updated with additional data, thereby providing more details for the objects having an importance factor above the minimum threshold, wherein the importance factor is defined as:

$$P = \frac{BN^2}{A}$$

wherein B is an importance factor defined by a user or an application, N is a difference between downloaded number of textures with increasing level of detail and a number of defined textures stored on the server, and 1/A is the inverse distance to the object from the observation point; and a display device configured to display the objects.

39. An electronic device for a computer system configured to display three dimensional computer modeled image scenes streaming from a server to at least one client computer over a network, wherein the three dimensional computer modeled image scenes comprise geometrical data describing shapes of objects and texture data describing the appearance of the objects in the scenes, and to start the displaying by transferring an initial file after receipt of a request from the client computer to the server computer, the initial file providing minimum geometrical data and minimum texture data for minimum visual quality, the minimum geometric data and minimum texture data to be used for an for an initial displaying, the system comprising:

in the client computer, electronic circuitry configured to initiate a further downloading of data from the server to the at least one client computer according to an importance factor indicating the importance of both visible objects and at present not visible objects that are associated with visible objects in the vicinity of an observation point, such that objects having an importance factor above a minimum threshold are updated with additional data, thereby providing more details for the objects having an importance factor above the minimum threshold, wherein the importance factor is defined as:

$$P = \frac{BN^2\sqrt{C+C_b}}{A}$$

wherein C is a screen coverage factor related to how much a texture covers a computer display surface, or how much a texture will be covering a computer display surface when being displayed, $C_b$ is a screen coverage factor related to how much of a texture covers an object located in a scene outside a computer display edge, B is an importance factor defined by a user or an application, N is a difference between downloaded number of textures with increasing level of detail and a number of defined textures stored the server, and 1/A is the inverse distance to the object from the observation point; and a display device configured to display the objects.

* * * * *